United States Patent [19]

Thong

[11] Patent Number: 4,635,094

[45] Date of Patent: Jan. 6, 1987

[54] METHOD AND APPARATUS FOR MEASUREMENT OF COMPONENT VIDEO SIGNAL CHARACTERISTICS USING AN OSCILLOSCOPE

[75] Inventor: Tran Thông, Beaverton, Oreg.

[73] Assignee: Tektronix, Inc., Beaverton, Oreg.

[21] Appl. No.: 662,718

[22] Filed: Oct. 19, 1984

[51] Int. Cl.$^4$ .............................................. H04N 17/02
[52] U.S. Cl. ......................................... 358/10; 358/88
[58] Field of Search ...................... 358/10; 324/79, 88, 324/83 A, 83 R

[56] References Cited

U.S. PATENT DOCUMENTS

| | | | |
|---|---|---|---|
| 3,534,155 | 10/1970 | Rhodes | 358/10 |
| 3,911,478 | 10/1975 | Rhodes | 358/10 |
| 4,488,168 | 12/1984 | Mino | 358/10 |

FOREIGN PATENT DOCUMENTS 143691 8/1983 Japan ...................... 358/10

OTHER PUBLICATIONS

H. P. Kelly, Color Video Tester, Electronics, Sep. 1954, pp. 128–131.

Primary Examiner—John W. Shepperd
Attorney, Agent, or Firm—William A. Birdwell; John Smith-Hill; Robert S. Hulse

[57] ABSTRACT

A method and apparatus for measuring characteristics of a component color video signal. In one embodiment the luminance component of a color video signal is applied to the vertical input of a cathode ray tube display device and a chrominance component is applied to the horizontal input. The resultant dots and transitions therebetween produced by the display trace provide an indication of component bandwidth, amplitude and relative time between components. All components can be compared simultaneously by alternately applying one chrominance component with the luminance component, and the other chrominance component with an inverted luminance component. In another embodiment one chrominance component is applied to the vertical input and the other is applied to the horizontal input. Delay circuits are provided for use with a time-division multiplexed video signal to compare time multiplexed components simultaneously. A graticule is provided for relating the display trace to a standard display.

14 Claims, 6 Drawing Figures

METHOD AND APPARATUS FOR MEASUREMENT OF COMPONENT VIDEO SIGNAL CHARACTERISTICS USING AN OSCILLOSCOPE

BACKGROUND OF THE INVENTION

This invention relates to component color video signal measurement methods and apparatus, particularly to measurements of spectral and temporal distortion, and to measurements of the characteristics of time-division multiplexed component video signals.

In conventional color television systems the color characteristics of the video image, that is, the luminance, hue, and saturation, are oridinarily represented by three signal components. The components sometimes used are one luminance component and two distinct chrominance ("chroma") components. The two chroma components are typically synthesized from a weighted combination of red, green, and blue signal levels.

The conventional method of transmission of television signals in the United States is based upon a method of frequency-division multiplexing adopted by the National Television System Committee (NTSC) in 1953. In that system signals representing the luminance and chroma components are frequency-division multiplexed and transmitted simultaneously. The chroma signals are shifted in phase 90 degrees from one another and thereafter used to modulate the same subcarrier, which is suppressed prior to adding the luminance signal with the product resulting from the subcarrier modulation. In demodulation the subcarrier must be regenerated. Hence, the relative phase and amplitudes of the chroma signals and the subcarrier are important.

Modern technology has led to a trend toward the adoption of time-division multiplexed color television modulation. In these systems the luminance and chroma components are separated from one another in time and transmitted in sequence. For example, for each horizontal scanline a first time-compressed chroma component segment corresponding to that scan line is transmitted followed immediately by the transmission of a time-compressed segment of the second chroma component corresponding to the same scan line. The corresponding segment of the luminance component is transmitted immediately thereafter. The luminance segment also may be time-compressed. At the receiver, the first and second chroma segments, and possibly also the luminance segment, are time expanded, and the first and second chroma segments are delayed relative to the luminance segment in order to bring the three segments into time coincidence. Methods known as "time compressed color component" (TC3) and "multiplexed analogue component" (MAC) are variations of the foregoing scheme.

In time-division multiplexed systems there is no color subcarrier, so there is no need to measure the relative amplitude and phase of chroma components in the traditional sense. However, the relative timing between chroma component segments, and between the luminance and chroma component segments is important, as it affects the accuracy of the transition from one color to another in the received image. The bandwidth of the signal channels for all of the components is still important because it affects image definition, and the relative signal levels of the components are important because they affect the hue and saturation of the image produced.

A well known instrument for measuring the amplitude and phase characteristics of an NTSC frequency-division multiplexed signal is a vectorscope, for example, a Tektronix Model 520A NTSC vectorscope. As is commonly known in the art, such an instrument is essentially an oscilloscope having video signal decoding circuitry that provides to the horizontal and vertical deflection circuitry two signals representing the chroma components of the video signal. The oscilloscope trace is referenced to a polar coordinate system on the graticule, thereby providing a display indicative of the phase relative to subcarrier and amplitude of the color signals. Typically, positions are shown on a graticule over the display of the dots created by the trace representing selected saturated hues employed in the generation of a test pattern, ordinarily a color bar pattern. The trace transition between the dots is of little significance, since its shape is principally a function of the circuitry of the vectorscope itself. Thus, while such an instrument is valuable for measuring the relative phase and amplitude characteristics of chroma in an NTSC signal, it is not useful for measuring the spectral or transient characteristic of such a signal, nor is it useful for measuring the timing of a time-division multiplexed component color video signal.

Accordingly, it would be desirable to have a method and apparatus for measuring the spectral, timing, and amplitude characteristics of any type of component color video signal, and specifically for the measuring of a time-division multiplexed signal.

SUMMARY OF THE INVENTION

The present invention provides a novel method and apparatus for measuring the characteristics of a component color video signal by means of a visual display.

In one embodiment of the invention, the chroma components of a component color video signal are compared to the luminance component. An electronic visual display apparatus having one input corresponding to the abscissa of a Cartesian coordinate system and another input corresponding to the ordinate, such as a cathode ray tube display, is employed, the decoded luminance component being applied to the ordinate input and the decoded chrominance component being applied to the abscissa input of the display. Considering those two signals as orthogonal vectors having directions along the ordinate and abscissa, respectively, the display shows a representation of the vector sum of those two signals. The resultant trace permits measurements of the relative bandwidth of the chrominance and luminance signals, time delays between the chrominance and luminance signals, and amplitude variations in the signals. Superposition of a graticule having a standard display reference on the face of the display apparatus allows these characteristics to be related to a standard, and quantified. Such a display is useful for bandwidth, time delay, and amplitude measurements in a decoded time-division multiplexed system, and bandwidth and amplitude measurements in a decoded frequency-division multiplexed system.

A first chroma component signal is provided to the abscissa while the luminance component signal is applied to the ordinate, are a second chroma component signal is provided to the abscissa while the luminance component signal is inverted and applied to the ordinate, and so forth. As a result the first two quadrants of the display compare the first chrominance component to the luminance component, and the last two quadrants of the display compare the second chroma component to the luminance component.

In the case of a time division multiplexed signal, time delay circuitry is provided so that the chroma component signals are shifted in time so as to occur, absent time delay distortion, simultaneously with corresponding portions of the luminance component signal.

Accordingly, it is a principle objective of the present invention to provide a novel method and apparatus for measuring the characteristics of a component color video signal.

It is another objective of the present invention to provide a visual display method and apparatus for measuring the relative spectral characteristics of a component color video signal.

It is a further objective of the present invention to provide a visual display method and apparatus for measuring the amplitude characteristics of a component color video signal.

It is another object of the present invention to provide a method and apparatus for measuring time delay distortion in a time-division multiplexed component color video signal.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
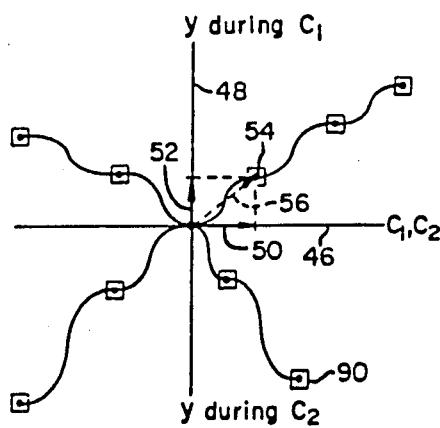
FIG. 1 shows an exemplary display according to the present invention wherein both chroma components are compared to the luminance component in a component color video system.

Referring to FIG. 1, the display of the present invention is based upon a Cartesian coordinate system wherein the amplitude of one signal is represented by a point on the abscissa 46 and the amplitude of the other signal is represented by a point on the ordinate 48. Those two signals can be represented as vectors in the directions of the abscissa and ordinate, respectively. The vector 50 corresponds to an instantaneous chroma component signal, while the vector 52 corresponds to an instantaneous luminance component signal. In the foregoing example dot 54 represents the vector sum 56 of the aforementioned chroma and luminance component signals.

Figure 2:
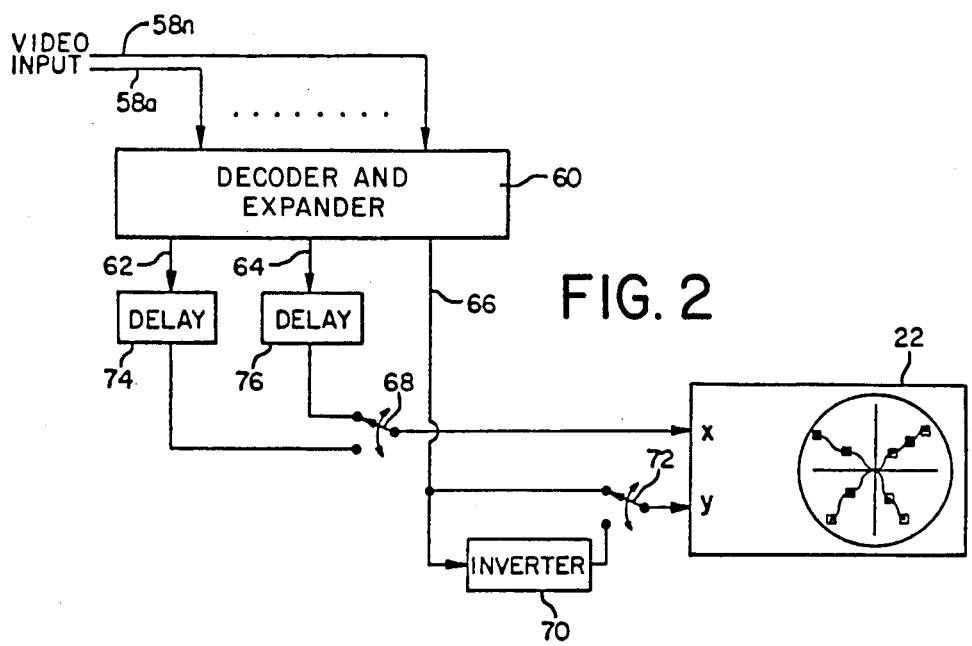
FIG. 2 shows a block diagram of an exemplary apparatus according to the present invention for producing the display shown in FIG. 1.

As a practical matter, the display is produced by an electronic visual display device such as a cathode ray tube display device 22, having a horizontal (x) input corresponding to the abscissa and a vertical (y) input corresponding to the ordinate, as shown in FIG. 2. The display is constructed so as to compare both chroma components to the luminance component. This is accomplished by alternately applying the luminance component signal to the vertical input while a first chroma component signal is applied to the horizontal input, then applying an inverted luminance component signal to the vertical input while the second chroma component signal is applied to the horizontal input, so that the first two quadrants of the display represent the first chroma component compared to the luminance component and the last two quadrants of the display represent the second chroma component compared to the luminance component, as shown in FIG. 1. This is because the minimum amplitude of the luminance signal is assumed to be zero, while the chroma signals take on both positive and negative values.

The aforedescribed display can be used effectively for frequency-division multiplexed as well as time-division multiplexed video signals. In FIG. 2 the video signal input is represented by one or more input channels 58a–58n. Where a composite frequency-division multiplexed or time-division multiplexed video signal is used, only one input channel is necessary. Additional channels may be desired for other types of systems. In the first case, a decoder 60 converts the video signal input into three components, that is, the chroma 1 component 62, the chroma 2 component 64, and the luminance component 66. Inversion of the luminance component signal is accomplishd by an inverter 70. Selection between the two chroma component signals is accomplished periodically by an electronic switch 68, and selection between the luminance component signal and the inverted luminance component signal is accomplished by an electronic switch 72, the two electronic switches being synchronized. In the case of a timedivision multiplexed video signal, in which the chroma components (and possibly also the luminance component) are time-compressed, the decoder 60 time expands the chroma components (and the luminance component if appropriate). Delay circuits 74 and 76 are provided for the chroma 1 and chroma 2 signals, respectively, in order for portions of those two signals and of the luminance signal corresponding to the same portion of the video image to occur simultaneously, absent time delay distortion.

Figure 3A:
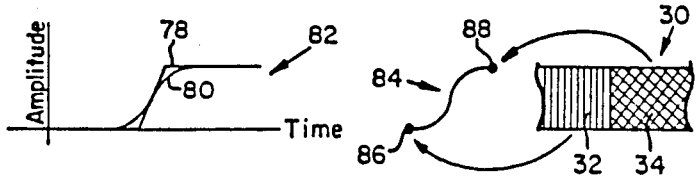
FIGS. 3(a)–(c) illustrate exemplary time domain representations of chrominance and luminance signals produced in response to a color bar test pattern, and the respective waveforms generated as the display produced by the apparatus shown in FIG. 6.

In FIG. 3(a), an idealized luminance component signal 78 and an idealized chrominance component signal 80 are shown in the time domain at 82. The image that would result in the display of the type shown in FIG. 1 is shown at 84. For a color bar test pattern 30, the color 32 would correspond to dot 86 and the color 34 would correspond to dot 88. Since the bandwidth of the luminance signal is ordinarily wider than the bandwidth of a chroma signal, an S-shape transitional trace ordinarily results. However, if a change in the bandwidth occurs, the shape of the transitional trace would change as well. Thus, the bandwidth characteristics can be measured by the shape of this transitional trace.

Figure 3B:
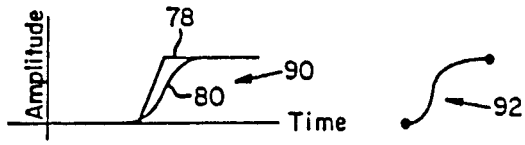
Figure 3C:
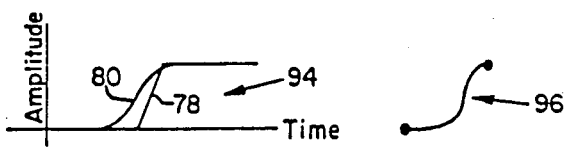

A condition where a chroma component signal is delayed with respect to the luminance component signal is shown at 90 of FIG. 3(b), and the resultant image is shown at 92. A condition where the chroma component signal is advanced with respect to the luminance component signal is shown at 94 of FIG. 3(c), and the resultant image at 96 thereof. It can be seen that a time delay also results in a distinct change in the shape of the transitional trace, that is, a shortening or lengthening of the ends of the S-shaped curve.

Figure 4:
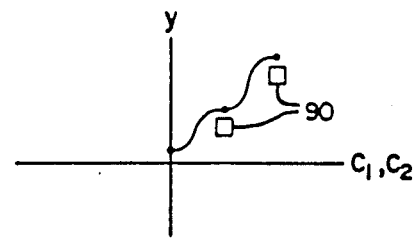
FIG. 4 illustrates an exemplary waveform representing amplitude offset in a video signal, as shown by the display of FIG. 1.

Referring again to FIG. 1, the positions that the dots, representing distinct colors of a color bar test pattern, should assume on the display can be identified on a graticule by an appropriate symbol, such as boxes 90. As shown in FIG. 4, where the luminance level is out of proportion to the chrominance level in a display of the type shown in FIG. 1, when the dots do not fall within their corresponding box, an amplitude error is indicated.

An appropriate graticule can be provided by conventional means, such as etching reference lines and symbols onto a glass plate. The plate is then placed over the face of the display apparatus, for example, over the face of a CRT. Alternatively, a graticule could be generated using the trace of the display device.

In use of the aforedescribed apparatus one would transmit an appropriate test pattern, that is, a color bar test pattern, over the video system and apply the received signal to the appropriate apparatus of FIG. 6. Measurement of the characteristics of the signal is accomplished by observing the resultant display trace, particularly by relating the shape and position of the trace to the symbols on the graticule.

It may be advantageous to employ smaller width color bars than have heretofore been used in an NTSC color bar test pattern to reduce the time that the display trace spends at the color dots relative to the transitional traces and thereby increase the relative intensity of the transitional traces, since the information contained in the transition traces is of great importance in the use of this method and apparatus.

The terms and expressions which have been employed in the foregoing specification are used therein as terms of description and not of limitation, and there is no intention of the use of such terms and expressions of exluding equivalents of the features shown and described or portions thereof, it being recognized that the scope of the invention is defined and limited only by the claims which follow.

I claim:

1. An apparatus for measurement of characteristics of a component color video signal having a luminance component and first and second chrominance components, said apparatus comprising:
   (a) display means for producing in two dimensions a visual representation of the vector sum of two display signals, each said display signal corresponding to a respective vector having a direction orthogonal to the other and lying in a Cartesian plane defined by said two dimensions, one said vector direction corresponding to the abscissa of a corresponding Cartesian coordinate system and the other said vector direction corresponding to the ordinate thereof, said display means having respective abscissa and ordinate signal inputs thereto; and
   (b) input means including
      (i) inverter means for producing an inverted luminance component, and
      (ii) switching means for alternately selecting said first and second chrominance components as one said display signal and providing the selected chrominance component to the display means as the abscissa input thereof, and alternately and synchronously selecting the luminance and the inverted luminance component as the other said display signal and providing the selected form of the luminance component to the display means as the ordinate input thereof.

2. The apparatus of claim 1 wherein said video signal is a time-division multiplexed component color video signal in which the chrominance components are compressed in time and shifted in time relative to the luminance component, the apparatus further comprising time shifter and expander means for producing from said video signal said chrominance components expanded in time relative to said luminance component and for bringing about relative shifting of said chrominance components and said luminance component in time by predetermined amounts relative to one another.

3. The apparatus of claim 1 further comprising graticule means superimposed on said display means for relating said visual representation to a standard, said graticule means including symbols identifying positions on said display corresponding to respective positions of a standard visual representation of selected hues.

4. The apparatus of claim 1 wherein said display means comprises a cathode ray tube display device, said abscissa input corresponding to the horizontal input thereof and said ordinate input corresponding to the vertical input thereof.

5. A method for measuring the characteristics of a component color video signal having a luminance component and first and second chrominance components, using a display means for producing in two dimensions a visual representation of the vector sum of two display signals, each said display signal corresponding to a respective vector having a direction orthogonal to the other and lying in a plane defined by said two dimensions, said plane of said display means being a Cartesian plane, one said vector direction corresponding to the abscissa of a Cartesian coordinate system and the other said vector direction corresponding to the ordinate thereof, one display signal being provided to the ordinate of the display means the other display signal being provided to the abscissa thereof, and said method comprising:
   (a) producing an inverted luminance component;
   (b) alternately providing to said display means as said one display signal the first and second chrominance components of said video signal; and
   (c) alternately and synchronously providing to said display means as said other display signal the luminance component of said video signal and the inverted luminance component.

6. The method of claim 5 wherein said video signal is a time-division multiplexed signal in which the chrominance components are compressed in time and shifted in time relative to the luminance component and said method further comprises expanding the chrominance components in time relative to said luminance component and bringing about a shift in time of said chrominance components and said luminance component so that, absent distortion, portions of said chrominance components and said luminance component corresponding to the same part of the video image would occur simultaneously.

7. The method of claim 5 further comprising superimposing a graticule on said display means for relating said visual representation to a standard, said graticule including symbols identifying positions on said display corresponding to respective positions of a standard visual representation of selected hues.

8. An apparatus for measurement of characteristics of a video signal in the form of a luminance component signal and first and second chrominance component signals, each component signal occurring in a succession of discrete segments and each segment of each chrominance component signal being substantially time-coincident with a corresponding segment of the luminance component signal, the apparatus comprising:
   (a) display means having a display surface, the display surface having first and second distinct display areas, and the display means being capable of producing in each display area a visual representation of the vector sum of two component vectors that lie along respective coordinate axes of a Cartesian coordinate system, each component vector being representative of the magnitude of a display signal; and
   (b) input means for providing the luminance component signal and the first chrominance component signal to the display means as the display signals for the first display area and for providing the luminance component signal and the second chrominance component signal to the display means as the display signals for the second display area.

9. Apparatus according to claim 8, wherein the coordinate axis of the first display area that is associated with the luminance component signal is collinear with the coordinate axis of the second display area that is associated with the luminance component signal.

10. Apparatus according to claim 9, wherein the coordinate axis of the first display area that is associated with the first chrominance component signal is coincident with the coordinate axis of the second display area that is associated with the second chrominance component signal and the coordinate axes of the first and second display areas respectively that are associated with the luminance component signal extend in opposite respective directions from the coordinate axes that are associated with the chrominance component signals.

11. Apparatus according to claim 8, wherein the display means comprise means for generating a visually distinct dot on the display surface, which dot can be deflected in two mutually perpendicular directions over the display surface in response to first and second deflection signals respectively, and wherein the input means comprise inverter means for producing an inverted luminance component signal, and switching means for alternately selecting the inverted luminance component signal and the non-inverted luminance component signal to be provided to the display means as the first deflection signal and for providing the first chrominance component signal as the second deflection signal when the non-inverted luminance component signal is provided as the first deflection signal and providing the second chrominance component signal as the second deflection signal when the inverted luminance component signal is provided as the first deflection signal.

12. Apparatus according to claim 8, for measurement of characteristics of a component video signal in time-division multiplexed relationship in a format that requires the segments of the first and second chrominance components to be time-compressed relative to the corresponding segments of the luminance component and to occur with predetermined respective time shifts relative to corresponding segments of the luminance component, and wherein the apparatus comprises decoding means for receiving the component video signal, separating the chrominance and luminance components from each other, time expanding the chrominance component segments and bringing about a relative shift in time of the chrominance component segments and the luminance component segments so that, absent distortion, each segment of each chrominance component segment is substantially time-coincident with a corresponding luminance component segment.

13. A method for measuring characteristics of a video signal in the form of a luminance component signal and first and second chrominance component signals, each component signal occuring in a succession of discrete segments and each segment of each chrominance component signal being substantially time-coincident with a corresponding segment of the luminance component signal, the method being performed using display means that has a display surface with first and second distinct display areas and is producing in each display area a visual representation of the vector sum of two component vectors that lie along respective coordinate axes of a Cartesian coordinate system, each component vector being representative of the magnitude of a display signal, and the method comprising:
   (a) providing the luminance component signal and the first chrominance component signal to the display means as the display signals for the first display area, and
   (b) providing the luminance component signal and the second chrominance component signal to the display means as the display signals for the second display area.

14. A method according to claim 13, wherein the display means generate a visually distinct dot on the display surface and the dot is deflected in two mutually perpendicular directions over the display surface in response to first and second deflection signals respectively, and wherein the method comprises inverting the luminance component signal, providing the inverted luminance component signal and the non-inverted luminance component signal alternately to the display means as the first deflection signal, providing the first chrominance component signal as the second deflection signal when the non-inverted luminance component signal is provided as the first deflection signal, and providing the second chrominance component signal as the second deflection signal when the inverted luminance component signal is provided as the first deflection signal.

* * * * *